July 27, 1965 G. A. DOTTO 3,196,695
COMBINED U.H.F.-V.H.F. INDEXING MECHANISM
Filed April 6, 1964 7 Sheets-Sheet 1

INVENTOR.
GIANNI A. DOTTO
BY
ATTORNEY

July 27, 1965   G. A. DOTTO   3,196,695
COMBINED U.H.F.-V.H.F. INDEXING MECHANISM
Filed April 6, 1964   7 Sheets-Sheet 2

INVENTOR.
GIANNI A. DOTTO
BY
ATTORNEY

July 27, 1965  G. A. DOTTO  3,196,695
COMBINED U.H.F.-V.H.F. INDEXING MECHANISM
Filed April 6, 1964  7 Sheets-Sheet 3
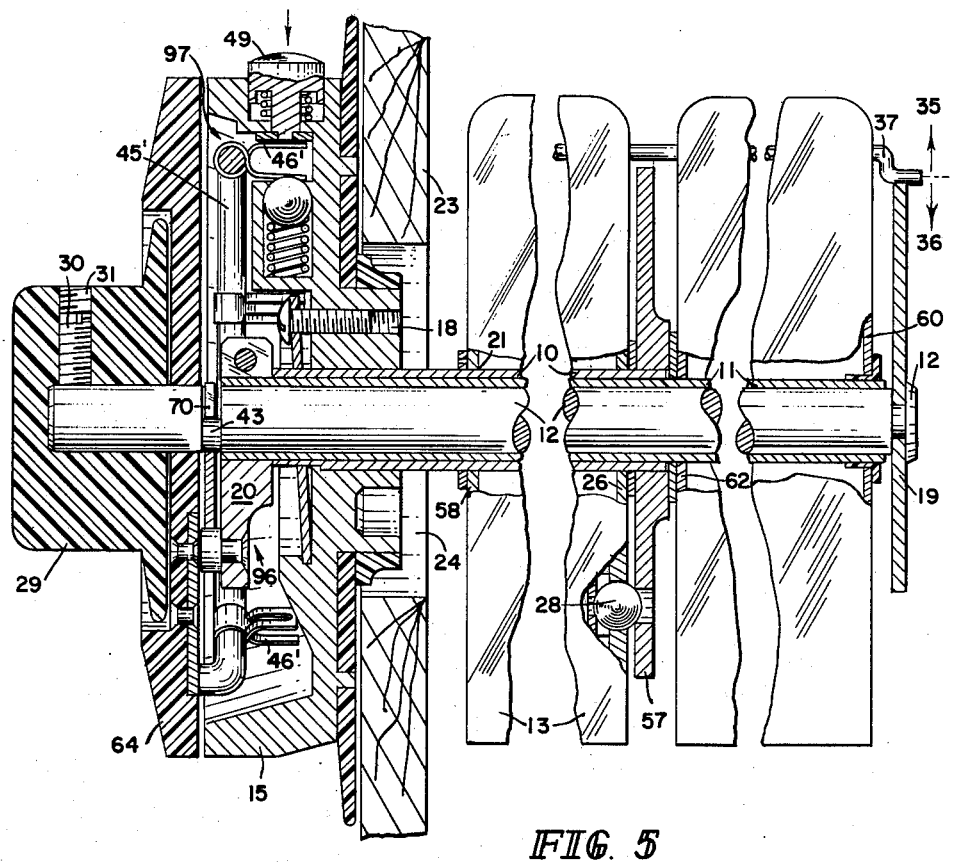
FIG. 5
FIG. 4
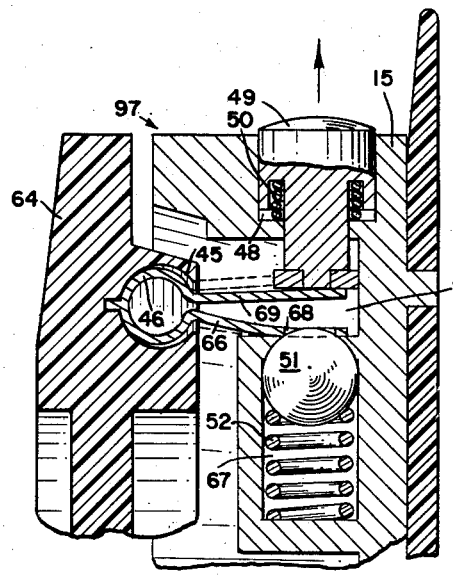
INVENTOR.
GIANNI A. DOTTO
BY
ATTORNEY

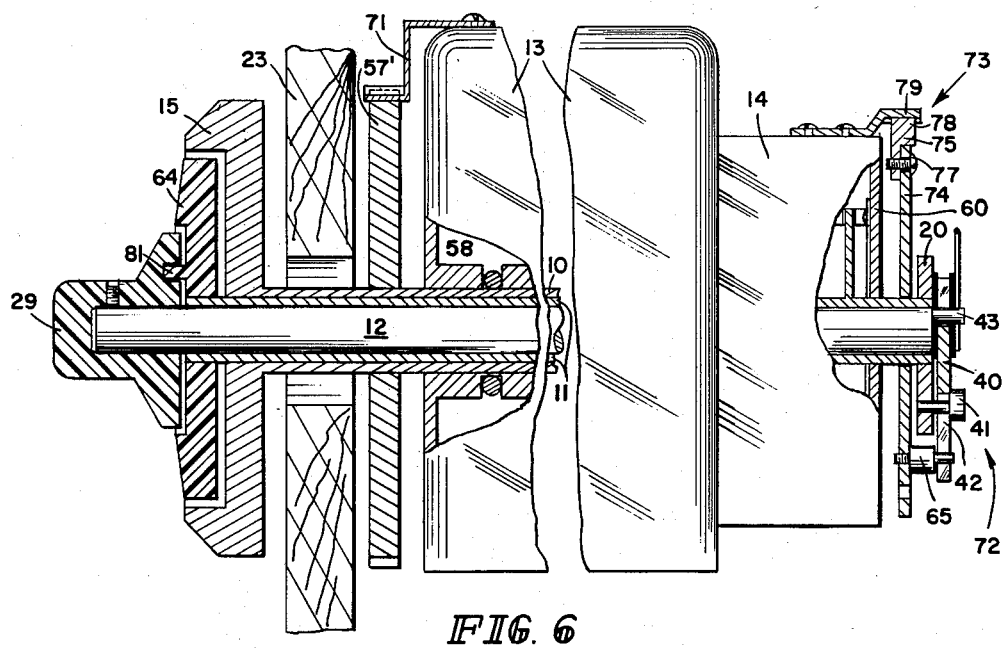
FIG. 6
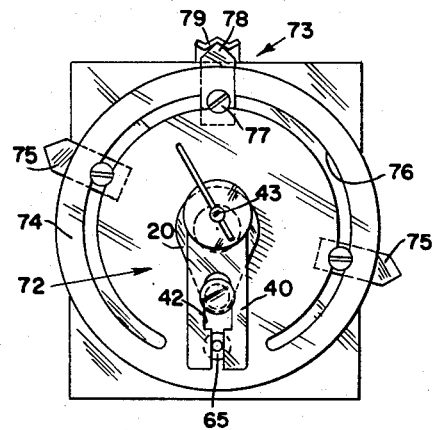
FIG. 7
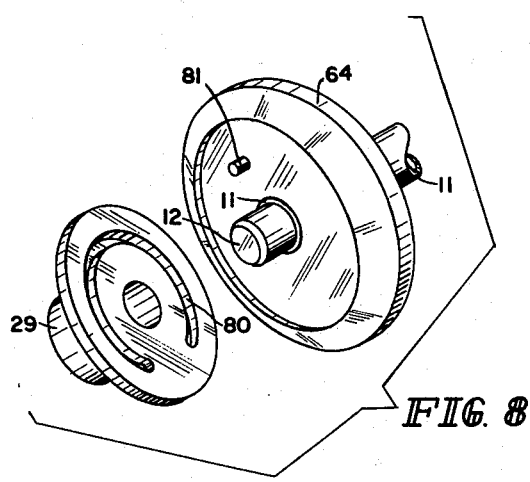
FIG. 8
INVENTOR.
GIANNI A. DOTTO
BY
ATTORNEY July 27, 1965 G. A. DOTTO 3,196,695
COMBINED U.H.F.-V.H.F. INDEXING MECHANISM
Filed April 6, 1964 7 Sheets-Sheet 5

INVENTOR.
GIANNI A. DOTTO
BY
ATTORNEY

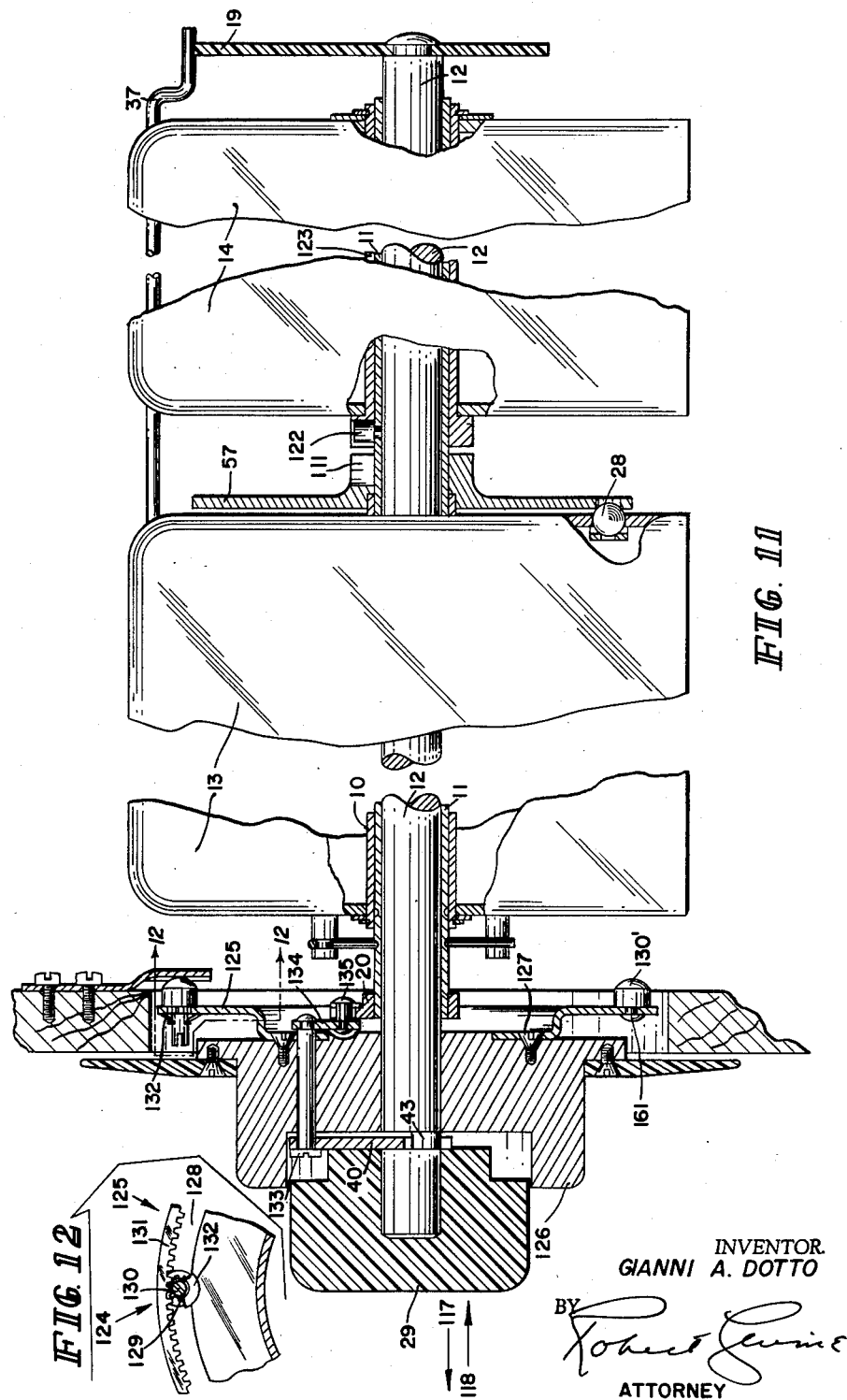

July 27, 1965 G. A. DOTTO 3,196,695
COMBINED U.H.F.-V.H.F. INDEXING MECHANISM
Filed April 6, 1964 7 Sheets-Sheet 7
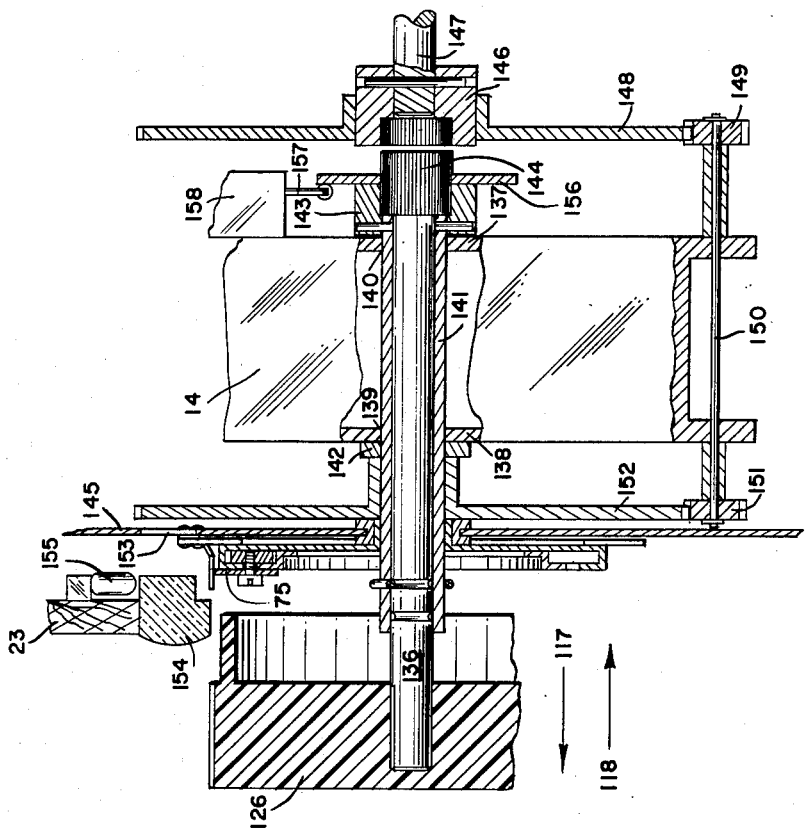
FIG. 13
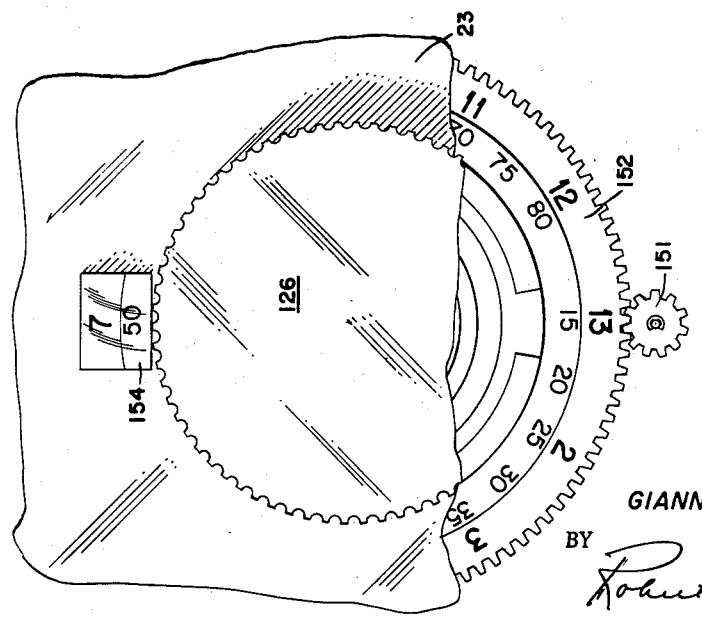
FIG. 14
INVENTOR.
GIANNI A. DOTTO
BY
ATTORNEY United States Patent Office 3,196,695
Patented July 27, 1965

3,196,695
COMBINED U.H.F.-V.H.F. INDEXING MECHANISM
Gianni A. Dotto, Dayton, Ohio, assignor to P. R. Mallory
& Co. Inc., Indianapolis, Ind., a corporation of
Delaware
Filed Apr. 6, 1964, Ser. No. 357,648
15 Claims. (Cl. 74—10.41)

The present invention relates to an index mechanism, more particularly to an index mechanism associated with tuners possessing the capacity of receiving television signals in widely separated frequency ranges such as the V.H.F. (very high frequency) band and the U.H.F. (ultra high frequency) band.

Mechanical index mechanisms are known and are used to index rheostats, radio receivers, oscillators, television receivers and any other type of device where indexing is desired and essential. The index mechanism of the present invention provides a unitary index mechanism associated with tuners for use in a television receiver to provide rapid and accurate tuning of the present V.H.F. television channels and in addition to provide an index mechanism for rapid and accurate tuning of the U.H.F. channels.

Several index mechanisms presently available are limited to indexing a relatively few television channels and in addition, are not capable of performing accurate indexing utilizing mechanical elements not possessing the same degree of mechanical accuracy. Several index mechanisms presently available are not capable of providing a combined V.H.F. and U.H.F. index means, but rather must use two physically disassociated index means to index each of the aforementioned tuners. In contrast, the unitary index mechanism with which the present invention is concerned, is an efficient, inexpensive, simple accurate, and effective means for indexing a combined V.H.F. and U.H.F. tuner. It is to be understood that the index mechanism of the present invention could be utilized to index any other type of device where rapid and accurate indexing is essential and desirable.

Therefore, it is an object of the present invention to provide a novel index means operatively associated with a plurality of frequency tuning devices and capable of indexing the tuners over a frequency range of wider scope than heretofore thought possible.

Another object of the present invention is to provide a simple, efficient and accurate index mechanism composed of a reduced number of components.

A further object of the present invention is to provide a unitary index mechanism associated with frequency tuners for reception in a plurality of spaced frequency ranges such as the present V.H.F. and U.H.F. television bands.

Still another object of the present invention is to provide an index mechanism with coaxial shafts cooperating to coarse index a tuner and to thereafter fine index a tuner.

Another object of the present invention is to provide a novel index mechanism wherein the V.H.F. channel selector knob and the U.H.F. channel selector knob are concentric each with the other and a fine tuning knob that is concentric with the aforementioned V.H.F. and U.H.F. channel selector knobs.

A further object of the present invention is to provide a novel fine indexing mechanism that rotates through a lesser angle than does a fine tuning knob rotating said mechanism.

Still another object of the present invention is to provide a novel aperture detent apparatus cooperating with a spring biased ball for the selection of a predetermined V.H.F. television channel.

Another object of the present invention is to provide a novle stair-step detent apparatus cooperating with wiper arms which in turn cooperates with an inductance to select a predetermined V.H.F. television channel.

A further object of the present invention is to provide a novel detent repositioning device for relocating the U.H.F. channel detents.

Still another object of the present invention is to provide a readily accessible detent repositioning mechanism associated with the U.H.F. channel selector to alter the position of the U.H.F. detents marking a desired U.H.F. television channel.

A further object is to provide a high degree of accuracy index means without utilizing the same mechanical accuracy.

Another object of the present invention is to provide novel and simple means to fine index a V.H.F. channel or a U.H.F. channel.

Still another object of the present invention is to provide a simple index mechanism in which accurate indexing is effected by a simple mechanical movement.

A further object of the present invention is to provide an index mechanism which indexes tuners efficiently and effectively, and is physically compact.

The present invention in another of its aspects, relates to novel features of the instrumentalities of the invention described therein for teaching the principal object of the invention and to the novel principles employed in the instrumentalities whether or not these features and principles may be used in the said object or in the said field.

With the aforementioned objects enumerated other objects will be apparent to those possessing ordinary skill in the art. Other objects will appear in the following description, appended claims, and appended drawings. The invention resides in the novel construction, combination, arrangement, and cooperation of elements as hereinafter described and more particularly as defined in the appended claims.

The appended drawings illustrate several novel and different embodiments of the present invention and constructed to function in the most advantageous modes devised for the practical application of the basic principles involved in the hereinafter described invention.

In the drawings:

FIGURE 4 is an enlarged cross sectional view of the U.H.F. push button apparatus.

FIGURE 5 is a fragmentary cross sectional view embodying a novel push button detent.

FIGURE 6 is a fragmentary cross sectional view illustrating the index mechanism having a fine tuning apparatus located to the rear of a U.H.F. tuner.

FIGURE 7 is a rear view of the U.H.F. detent apparatus of FIGURE 6.

FIGURE 8 is a perspective view of the U.H.F. channel selector knob and the U.H.F. fine tuning knob of FIGURE 6.

FIGURE 11 is a fragmentary cross sectional view illustrating an important embodiment of the index mechanism whereby the U.H.F. detents are positionable by means of a rotatable gear.

FIGURE 12 is the U.H.F. detent of FIGURE 11 but shown from a front view.

FIGURE 13 is a fragmentary cross sectional view illustrating a novel push pull index mechanism for tuning a V.H.F. tuner or a U.H.F. tuner.

FIGURE 14 is a fragmentary front view of the channel selector knob and associated gears of the index mechanism of FIGURE 13.

Generally speaking, the present invention relates to an index means for a plurality of shafts comprising a plurality of rotatable, coaxial shafts to be indexed, means for supporting said plurality of shafts, an index means on at least one of said rotatable shafts for coarsely indexing said plurality of rotatable shafts, a fine index means coupled to one of said plurality of rotatable shafts to fine index another of said plurality of rotatable shafts, and at least one rotatable index knob coupled to each of said plurality of rotatable shafts.

In operation, the index means is utilized to index two tuners possessing the capacity of receiving television signals in widely separated frequency ranges. To accomplish this result, the present invention uses three coaxial, rotatable shafts capable of independent rotation. A first shaft of said three shafts is coupled to a detent means that indexes the first shaft as the first shaft is rotated. A second shaft of said three shafts is carried with the first shaft and is coupled to an adjustable detent means that indexes the second shaft when said second shaft is rotated. The adjustable detent is an annulus coupled to said second shaft that has a groove cut therein to mount a plurality of radially projecting means that are angularly adjustable. A third shaft of said three shafts is carried within the second shaft and is coupled to a first fine index means for fine indexing a tuner coarse indexed by the first shaft and coupled to a second fine index means for fine indexing the second shaft when said third shaft is rotated. The first fine indexing means for the first shaft is a cam rotatably coupled to said third shaft. The cam has a movable double L-shaped wire mounted on its uppermost periphery that is movable therewith. A slidable core is movable in relation to an inductance coil to vary the inductance of said coil as the third shaft is rotated to fine index said first shaft. The fine index means of the second shaft utilizes a portion of the third shaft that has a smaller diameter than the third shaft. This portion of the third shaft has its axis displaced from the axis of said third shaft. A pivotable means has one of its extremities coupled to said portion of the third shaft and said pivotable means has a pivotable point located at its major axis. A means couples the pivotable point to a positioning means. The positioning means is coupled to the second shaft to fine index the second shaft upon rotation of the third shaft.

Figure 1:
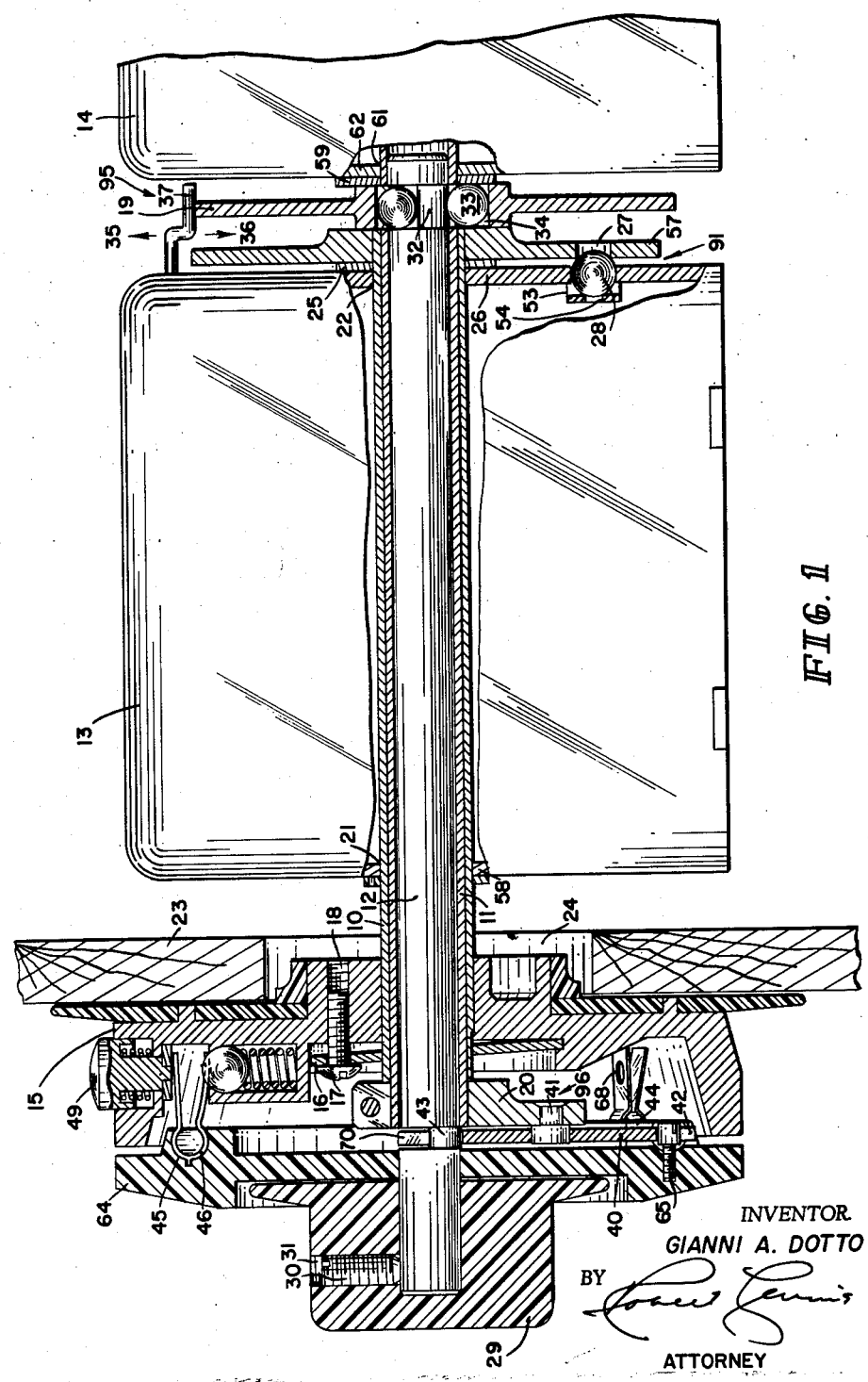
FIGURE 1 is a side view with certain parts broken away of an index mechanism embodying the present invention.
Figure 2:
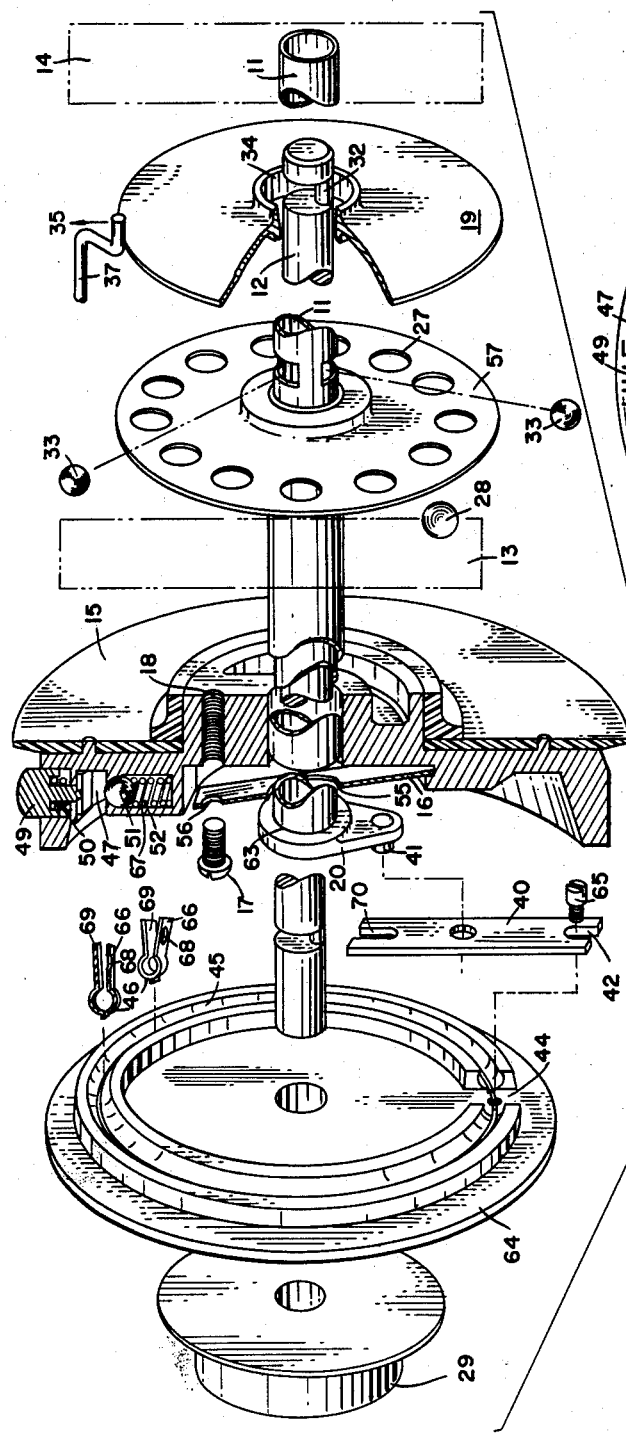
FIGURE 2 is a perspective view of an index mechanism embodying the present invention.
Figure 3:
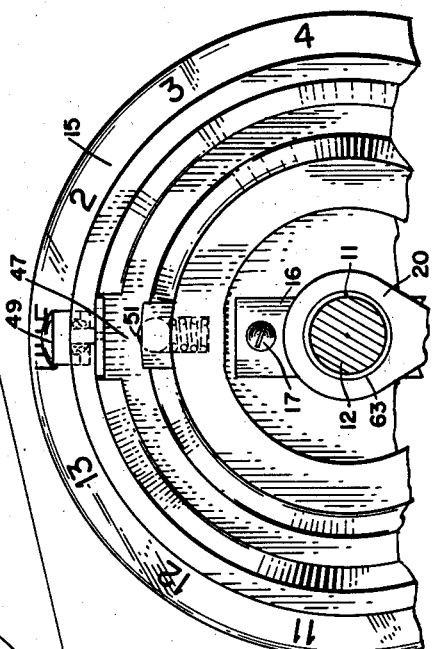
FIGURE 3 is a partial front view of the V.H.F. channel selector knob and associated U.H.F. push button apparatus to position U.H.F. detents.

Referring now to FIGURE 1, hollow shaft 10 is the primary tuning shaft of V.H.F. tuner 13. Inasmuch as the details of construction of the tuner do not constitute the present invention, no detailed description thereof will be given. V.H.F. channel selector knob 15 is firmly coupled to hollow shaft 10 by means of apertured metal securing plate 16. Aperture 55 of securing plate 16 interfits with hollow shaft 10 to pressure lock hollow shaft 10 in position. A screw 17 interfits with threaded aperture 18 of V.H.F. channel selector knob 15 and aperture 56 of securing plate 16 such that the tightening of screw 17 into V.H.F. channel selector knob 15 increases the pressure exerted by securing plate 16 on hollow shaft 10 thus firmly locking securing plate 16 and V.H.F. channel selector knob 15 to hollow shaft 10. It is manifest, rotational displacement imparted to V.H.F. channel selector knob 15 will cause a proportional rotational displacement by hollow shaft 10.

V.H.F. tuning shaft 10 is a hollow shaft that extends through aperture 24 of television chassis 23 permitting V.H.F. channel selector knob 15 to be attached to shaft 10 and positioned without chassis 23 of a television receiver. V.H.F. tuning shaft 10 is situated between and abuts both cam 19 and positioning plate 20. Tuning shaft 10 extends through apertures 21 and 22 of V.H.F. tuner 13. Aperture 21 is centrally located on end plate 58, said end plate forms a first end wall of V.H.F. tuner 13. Aperture 22 is centrally positioned on end plate 26, said end plate forms a second end wall of V.H.F. tuner 13 and is positioned opposite end plate 58. Apertures 21 and 22 are situated on a horizontal line to permit hollow shaft 10 to traverse the length of V.H.F. tuner 13 and project therethrough. Hollow shaft 10 is conventionally journalled to opposite end plates 26 and 58 in such a manner as to permit hollow shaft 10 to be rotationally displaced in proportion to the rotational displacement of V.H.F. channel selector knob 15.

An apertured detent means 91 is comprised of apertured detent disc 57, spring biased ball 28 and spring arm 53. Apertured detent disc 57 is pressure fitted, welded, or soldered to hollow shaft 10 between cam 19 and washer 25. Washer 25 is utilized to predeterminedly space apertured detent disc 57 from second end plate 26 and to restrain longitudinal movement of detent 57.

Apertured detent disc 57, securely coupled to hollow shaft 10 is provided with thirteen equally spaced apertures 27. Each aperture is centered on a continuous line drawn in close proximity to the outer periphery of detent disc 57. Twelve of the apertures 27 are utilized to index the position of a single V.H.F. television channel on hollow shaft 10, whereas the thirteenth aperture is utilized to position hollow shaft 10 such that V.H.F. tuner 13 is rendered ineffective electrically and thus permit U.H.F. tuner 14 to be indexed as hereinafter described.

As disclosed hereinbefore, apertured detent disc 57 is provided with thirteen equally spaced apertures 27 that define predetermined rotary positions of hollow shaft 10 and hence the location of one of the twelve V.H.F. television channels. Firmly positioned in the vertical plane of rear end plate 26 and interfitting with an aperture 27 of detent disc 57 is spring biased ball 28. Ball 28 is secured in position in a first horizontal direction by spring arm 53 that is anchored to rear end plate 26 by a rivet or other suitable means. Spring arm 53 possesses aperture 54 that is smaller in diameter than ball 28 and is utilized to seat ball 28. Ball 28 is secured in the second horizontal direction by one of apertures 27 which is smaller in diameter than ball 28 but which interfits therewith.

When V.H.F. channel selector knob 15 is rotationally displaced to the next V.H.F. television channel, hollow shaft 10 is rotationally displaced and thus apertured detent disc 57 is rotationally displaced proportional to rotational displacement of V.H.F. channel selector knob 15. The non apertured portion of detent disc 57 forces spring biased ball 28 against spring arm 53. Spring arm 53 is displaced horizontally sufficient to allow the non apertured portion of detent disc 57 to slide over spring biased ball 28. When a succeeding aperture 27 in detent disc 57 is positioned opposite ball 28, spring arm 53 forces ball 28 into its original position of interfitting with an aperture 27. The repositioning of spring biased ball 28 into aperture 27 causes an audible click denoting the transfer from one V.H.F. channel to a succeeding V.H.F. channel.

Hollow V.H.F. tuning shaft 10 carries therein and coaxial therewith fine tuning shaft 12. Fine tuning shaft 12 is rotatably mounted within hollow shaft 10 in such a way that rotational displacement of shaft 12 does not rotationally displace hollow shaft 10. Fine tuning knob 29 is firmly attached to shaft 12 by means of screw 30 that interfits with threaded aperture 31 of knob 29. Screw 30 is tightened against shaft 12 in a conventional manner to couple knob 29 to shaft 12. Therefore, rotational displacement of fine tuning knob 29 will be transferred to fine tuning shaft 12.

A first fine index means is shown generally by numeral 95. Fine tuning shaft 12 extends beyond both extremities of hollow shaft 10 and therefore shaft 12 is longer than hollow shaft 10. As hereinbefore disclosed hollow shaft 10 extends between and abuts positioning plate 20 and cam 19. A portion 32 of shaft 12 passes through aperture 34 of cam 19. Portion 32 of shaft 12 is milled to form a smaller, circular shaft out of said portion of shaft 12 similar in shape of a crankshaft. Portion 32 has its axis midway between the axis of shaft 12 and the periphery of shaft 12. Since portion 32 is a milled part of shaft 12, portion 32 will rotate with shaft 12 when shaft 12 is revolved by manual rotation of fine tuning knob 29. However, the unusual location of the axis of portion 32 of shaft 12 with respect to the axis of shaft 12 will cause the axis of portion 32 to traverse an arc with the arc's center positioned on the axis of shaft 12.

Around the periphery of portion 32 a plurality of ball bearings 33 are situated. Ball bearings 33 are retained in vertical position by portion 32 of shaft 12. Ball bearings 33 are retained in horizontal position by the combination of shaft 12, apertured detent disc 57 and washer 59 that co-act to provide a horizontal seat for bearings 33. Thus as the axis of portion 32 rotates around the axis of shaft 12, bearings 33 will be displaced upwardly in the direction of arrow 35 and thereafter downwardly in the direction of arrow 36.

Circular cam 19 possesses an aperture 34 that is journalled to portion 32 of shaft 12 by ball bearings 33. Therefore, cam 19 is positioned in the vertical direction by the location of portion 32 of shaft 12. Circular cam 19 is positioned in the horizontal direction between apertured detent disc 57 and washer 59 which prevent longitudinal displacement by cam 19. It is manifest that the maximum vertical displacement of cam 19 will be in direct proportion to the diameter of portion 32 of shaft 12 when shaft 12 is rotated through 360 degrees.

Riding on the uppermost periphery of cam 19 is one extremity of double L-shaped wire 37. The other extremity of double L-shaped wire 37 is formed in the shape of hook 39. Hook 39 is firmly attached to a core 38 which is slidable with respect to an inductive coil (not shown). When circular cam 19 is displaced upwardly in the direction of arrow 35 or downwardly in the direction of arrow 36, the extremity of double L-shaped wire 37 riding on the uppermost periphery of circular cam 19 is displaced either to the right or to the left depending on the initial location of portion 32 and the direction of rotation of shaft 12. The unique shape of double L-shaped wire 32 moves core 38 into or out of an inductance (not shown) thus increasing or decreasing the inductive coupling of the inductance (not shown), hence fine tuning the V.H.F. tuner 13.

Hollow V.H.F. tuning shaft 10 carries therein and coaxial therewith hollow U.H.F. tuning shaft 11. Hollow U.H.F. tuning shaft 11 carries therein and coaxial therewith fine tuning shaft 12. U.H.F. tuning shaft 11 is rotatably journalled in the rear wall 60 of U.H.F. tuner 14 and projects therethrough to aperture 61 of front wall 62 of U.H.F. tuner 14. U.H.F. tuning shaft 11 does not terminate at aperture 61 but rather continues through aperture 61, through the aperture of washer 59, through aperture 34 of cam 19, through the aperture of washer 26, through aperture 22 of rear end plate 26 of V.H.F. tuner 13, through aperture 21 of front end plate 58 of V.H.F. tuner 13, through the aperture of V.H.F. channel selector knob 15, and through aperture 63 of positioning plate 20 and terminating at the frontmost side of positioning plate 20.

U.H.F. channel selector knob 64 is seated on fine tuning shaft 12 and situated between fine tuning knob 29 and V.H.F. channel selector knob 15. Fine tuning shaft 12 rotates independent of U.H.F. channel selector knob 64. U.H.F. channel selector knob 64 is firmly coupled to U.H.F. tuning shaft 11 by the combination of positioning plate 20 which may be soldered, pressure fitted, welded, or notch fitted to U.H.F. tuning shaft 11; a pivotable arm 40 having its major plane parallel to the major axis of positioning plate 20 is pivotably coupled to positioning plate 20 by securing pin 41; a screw 65 turned into a threaded aperture (not shown) in U.H.F. channel selector 64, said screw interfitting with slotted end portion 42 of pivotable arm 40 furthest from U.H.F. tuning shaft 12; and a notched portion 44 of the U.H.F. channel selector knob 64 in which the extremity furthest from U.H.F. tuning shaft 12 interfits. Notched portion 44 is sufficiently wide to permit pivotable arm 40 to oscillate therein and sufficiently long to allow U.H.F. channel selector knob 64 to engage pivotable arm 40 and thus rotatably displace pivotable arm 40. As hereinbefore described, pivotable arm 40 is coupled to positioning plate 20 by securing pin 41. It is manifest that rotational displacement of U.H.F. channel selector knob 64 will be transmitted to pivotable arm 40 and hence to positioning plate 20 such that a 360 degree rotation by U.H.F. channel selector knob 64 will result in a 360 degree rotation by U.H.F. tuning shaft 12.

An adjustable detent means is generally shown by numeral 97. On the rear side of U.H.F. channel selector is a three quarter circular groove 45 that is cut in close proximity to and parallel to the outer periphery of U.H.F. channel selector knob 64. The circular groove 45 traverses 360 degrees, and is uninterrupted except for notched portion 44 which cuts across and is substantially perpendicular to circular groove 45 of U.H.F. channel selector knob 64. Interfitting with three-quarter groove 45 is resilient detent 46. Resilient detent 46 is essentially V-shaped except for the crotch of the V which is substantially a three quarter circle of such diameter so as to interfit with three quarter groove 45.

A rectangular notch 47 is cut into V.H.F. channel selector knob 15 and lies coaxial with three quarter circular groove 45. The depth and height of rectangular notch 47 is sufficient so as to accommodate the V-portion of resilient detent 46. The V-portion of resilient detent 46 projects into rectangular notch 47, however, no portion of resilient detent 46 contacts the uppermost or the lowermost walls of rectangular notch 47. This construction allows the V-shaped portion of resilient detent 46 to be rotated through the rectangular notch 47 without frictional contact therewith.

V.H.F. channel selector knob 15 has cut therein aperture 48 which extends from the uppermost surface of knob 15 through the uppermost wall of rectangular notch 47. Aperture 48 in V.H.F. channel selector knob 15 provides a housing for resilient detent positioning plunger 49. Detent positioning plunger 49 is biased upwardly by spring 50. Spring 50 can be maintained in position by any conventional means such as a recess extending around the uppermost portion of a stem of plunger 49 and a sleeve extending around the lowermost portion of the stem of plunger 49. The lowermost portion of the stem of plunger 49 forms the uppermost wall of rectangular notch 47.

Spaced from and underlying the lowermost portion of the stem of plunger 49 and substantially forming the uppermost wall of rectangular notch 47 is spring biased ball 51. A portion of the periphery of spring biased ball 51 lies in the plane of the lowermost wall of rectangular notch 47. Spring biased ball 51 is seated in position with respect to V.H.F. tuning knob 15 by recess 67 of V.H.F. channel selector knob 15. Biasing ball 51 upwardly is spring 52, however, the opening of recess 67 is smaller than the diameter of ball 51, therefore, ball 51 cannot be forced out of recess 67 by spring 52.

It is manifest from the foregoing discloseure that if more than one U.H.F. channel is desired to be predeterminably located on shaft 11, a plurality of resilient detents 46 must be predeterminably located within three quarter circular groove 45. This is true for a resilient detent can locate but a single U.H.F. channel. Therefore, a plurality of resilient detents 46 are positioned at predetermined locations in three quarter circular groove 45 to mark a predetermined U.H.F. channel. Since a particular geographical area is allocated a maximum of five U.H.F. channels out of a possible sixty-nine U.H.F. channels, only five resilient detents 46 need be placed in three quarter circular grove 45 at predetermined locations.

Resilient detent 46 possesses aperture 68 in its lower leg 66 that interfits with a portion of the periphery of ball 51 that extends above the lowermost wall of rectangular notch 47. Thus when U.H.F. channel selector knob 64 is rotationally displaced to a U.H.F. television channel, not only is hollow U.H.F. tuning shaft 11 rotationally displaced as hereinbefore described, but so are the resilient detents 46. The non-apertured portion of resilient detents 46 forces spring biased ball 51 downwardly against spring 52. The displacement of spring 52 in the vertical direction is sufficient to allow the non-apertured portion of resilient detent 46 to slide over the spring biased ball 51. When aperture 68 is opposite ball 51, spring 52 forces ball 51 back to its original position of interfitting with aperture 68 of resilient detent 46. The repositioning of the spring biased ball 51 emits an audible click denoting the transfer from one U.H.F. channel to a succeeding U.H.F. channel.

If it is desirable to reset a preset resilient detent 46 to a second predetermined position, detent positioning plunger 49 is utilized. Such a situation would arise when the television receiver is transported from one geographical location to another geographical location which does not possess the identical U.H.F. telecasting channels as does the former location. A resilient detent 46 is positioned so that aperture 68 of lower leg 66 interfits with spring biased ball 51. As described hereinbefore, the stem of plunger 49 overlies and is spaced from ball 51. Thus plunger 49 overlies uppermost leg 69 and lowermost leg 66 of resilient detent 46. A downwardly exerted manual force against plunger 49 will displace plunger 49 downwardly. The lower portion of the stem of plunger 49 will engage uppermost leg 69 displacing said leg downwardly toward the spring biased ball 51. The spring biased ball is likewise displaced downwardly until the lowermost leg 66 engages the lowermost wall of rectangular notch 47. The lowermost wall of rectangular notch 47 is not resilient, therefore, the lowermost leg 66 can no longer be displaced in the downward direction, hence, the periphery of the three quarter circular portion of V-shaped resilient detent 46 is reduced as uppermost leg 69 is displaced toward lowermost leg 66. The resilient detent 46 is no longer engaged with three quarter grove 45 of U.H.F. channel selector knob 64 thus the U.H.F. channel selector knob 64 is free to rotate independent of resilient detent 46 since said detent is frictionally retained in position as hereinbefore described while U.H.F. channel selector knob is rotated to a desired, predetermined U.H.F. channel. When a desired, predetermined channel is located, manual pressure exerted against plunger 49 is withdrawn. Spring 50 forces plunger 49 upwardly permitting resilient detent 46 to assume a secured position in the three quarter groove 45 of U.H.F. channel selector knob 64. Thereafter this particular U.H.F. channel will be predeterminably marked by resilient detent 46. As disclosed hereinbefore such marking is effected by an audible click as aperture 68 rides into contact with spring biased ball 51. It is understood plunger 49 could be utilized to initially position resilient U.H.F. detent 46 as well as to reposition resilient U.H.F. detent 46. It is further understood sixty-nine resilient detents could be predeterminably positioned within three quarter groove 45 so as to predeterminably mark sixty-nine U.H.F. channels.

A second fine tuning means is generally shown by numeral 95. The fine tuning of the U.H.F. channels is accomplished by manually rotating fine tuning knob 29 until the desired U.H.F. reception is apparent. Fine tuning knob 29 is mechanically coupled to fine tuning shaft 12 as hereinbefore disclosed. The portion of fine tuning shaft 12 extending between the rear portion of U.H.F. channel selector knob 64 and the front portion of positioning plate 20 is milled to form portion 43 of shaft 12. Portion 43 of shaft 12 is modified to achieve accurate fine tuning results utilizing a mechanical mechanism not inherently possessing such accuracy. Portion 43 of shaft 12 is milled so as to form a smaller, circular shaft out of this section of shaft 12. Portion 43 has its axis midway between the axis of shaft 12 and the periphery of shaft 12. Since portion 43 is a milled part of shaft 12, portion 43 will rotate with shaft 12 when shaft 12 is rotated by manual rotation of fine tuning knob 29. However, the unusual position of the axis of portion 43 of shaft 12 with respect to the axis of shaft 12 will cause the axis of portion 43 to traverse a circle with its center being a point on the axis of shaft 12 and said circle possesses a diameter equal to the diameter of portion 43.

Interfitting with milled portion 43 of shaft 12 is slotted end portion 70 of pivotable arm 40. Slotted end portion 70 of pivotable arm 40 is at least in length equal to the diameter of shaft 12 and in width at least equal to the diameter of portion 43 of shaft 12. When shaft 12 is rotated by fine tuning knob 29, the axis of portion 43 traverses a circular arc that is proportional to the diameter of shaft 12 causing pivotable arm 40 to oscillate through a relatively few degrees in the horizontal plane.

As disclosed hereinbefore, pivotable arm 40 pivots or oscillates about the axis of securing pin 41. Slotted end portion 42 of U.H.F. channel selector knob 64 is sufficiently wide to allow pivotable arm 40 to oscillate a few degrees without displacing U.H.F. channel selector knob 64. It is seen that if fine tuning shaft 12 is rotated through 360 degrees, pivotable arm 40 will return to its initial position.

As hereinbefore disclosed, pivotable arm 40 is coupled to U.H.F. tuning shaft 11 by means of securing pin 41 and positioning plate 20.

Vertical displacement of pivotable arm 40 by portion 43 of shaft 12 will be translated into rotational displacement of U.H.F. tuning shaft 11. The structural arrangement of and the cooperation between pivotable arm 40, fine tuning shaft 12, portion 43, securing pin 41, positioning plate 20 and U.H.F. tuning shaft 11 will displace U.H.F. tuning shaft 11 through an arc of approximately four degrees with a 360 degree displacement of fine tuning shaft 12. The arc of four degrees is traversed, for example, in the following manner: two degrees clockwise, four degrees counterclockwise, and two degrees clockwise.

The embodiment of FIGURE 5 differs only in the construction of the seat for resilient detents 49 and the placement of and physical shape of V.H.F. fine tuning cam 19. The seat for resilient detents 46' is a detent seating ring 45' which is securely coupled to U.H.F. channel selector knob 64 by either welding, pressure fitting, soldering, riveting, or by any other suitable means. The resilient detents 46' are substantially the same shape as heretofore described except that the crotch of the V-shaped detent, which engages detent seating ring 45', is now a complete circle instead of a three-quarter circle. The V.H.F. fine tuning cam 19 is coupled directly to fine tuning shaft 12 eliminating the necessity of ball bearings 33. Cam 19 is not coupled to the shaft at its axial center, but at some other point, thus when cam 19 is rotated double L-shaped wire 37 riding on the uppermost periphery of cam 19 is displaced either to the right or to the left depending on the initial position of cam 19 and the direction of rotation of shaft 12. Since cam 19 is placed to the rear of U.H.F. tuner 14, a portion of double L-shaped wire 37 passes therethrough for convenience only.

The embodiment of FIGURE 6 includes several features not found in other figures. A V.H.F. detent disc 57' is placed between chassis 23 and the front end plate 58 of the V.H.F. tuner 13. Detent disc 57' is pressure fitted, welded, soldered or attached to V.H.F. tuning shaft 10 by any other suitable means. V.H.F. detent disc 57' has on its outer periphery thirteen equally spaced teeth therearound to mark the location of a V.H.F. television channel on shaft 10. As disclosed hereinbefore, the thirteenth location is the location that eliminates V.H.F. tuner 13 from a tuning circuit and permits U.H.F. tuner 14 to tune the television receiver to a U.H.F. channel upon manual rotation of U.H.F. channel selector knob 64. The means for seating V-shaped portion of V.H.F. detent disc 57' is resilient Z-shaped seat 71 that has one leg securely coupled to the uppermost wall of V.H.F. tuner 13 and a lower leg that engages the V-shaped portion of V.H.F. detent disc 57' to retain said detent disc in position until sufficient manual pressure is exerted to rotate said V-shaped portion of V.H.F. detent disc 57' out of engagement with the lower leg of resilient Z-shaped seat 71.

U.H.F. fine tuning assembly 72 functions the same as disclosed hereinbefore except that said assembly is positioned rearward of U.H.F. tuner 14. A detent index mechanism 73 is composed of a detent frame 74 that is coupled to U.H.F. tuning shaft 11 by any suitable means and is provided with an arcuate slot 76 concentrically aligned relative the outer periphery of detent frame 74. A plurality of adjustable detents 75 are positioned along the length of slot 76 and may be locked in selected angular position by means of locking screws 77. A V-shape portion 78 of detents 75 engages with a mating portion of seating assembly 79 to firmly hold detent indexing mechanism 73 in place until the rotational pressure exerted on U.H.F. tuning shaft 11 is sufficient to ride detent 75 out of seating assembly 79.

The U.H.F. television channels are selected and are fine tuned by manually rotating fine tuning knob 29 which knob is in cooperative relation with U.H.F. channel selector knob 64. Fine tuning knob 29 has cut therein slot 80 which mates with node 81 of U.H.F. tuning knob 64. Slot 80 is concentrically aligned relative to the outermost periphery of the fine tuning knob 29 and extends through a circular arc of approximately 320 degrees. Node 81 will engage an extremity of slot 80 after a predetermined arc is traversed by fine tuning knob 29 and thus U.H.F. channel selector knob 64 will rotate thereafter in the direction of rotation of fine tuning knob 29 to select a U.H.F. television channel. When the desired U.H.F. channel is selected, fine tuning knob 29 can be rotated in the reverse direction approximately 320 degrees before node 81 will again engage the other extremity of slot 80 thus permitting fine tuning of the U.H.F. channel as hereinbefore described without affecting the channel selection.

Figure 9:
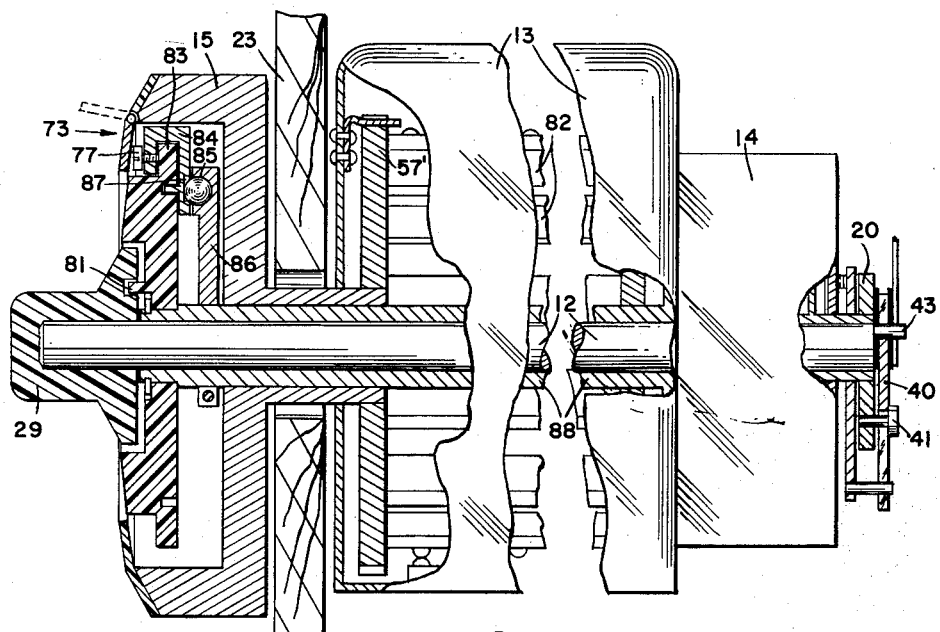
FIGURE 9 is a fragmentary cross sectional view illustrating an index mechanism having a U.H.F. screw release detent located on the U.H.F. channel selector knob.

The embodiment of FIGURE 9 differs from the embodiment of FIGURE 6 in the location of V.H.F. detent disc 57' and in the structure and the location of U.H.F. detent indexing means 73. V.H.F. detent disc 57' is placed in the interior of V.H.F. tuner 13 and is directly coupled to conventional V.H.F. tuning elements 82. U.H.F. detent indexing means 73 is physically located between the V.H.F. channel selector knob 15 and fine tuning knob 29. A rim 83 on rotatable U.H.F. channel selector knob 64 is utilized to seat F-shaped detent 84. A plurality of F-shaped detents 84 are positionable along the length of rim 83 and may be locked in selected positions thereon by locking screws 77. A ball 85 is situated on resilient arm 86 in such a manner as to interfit with notched portion 87 of F-shaped detent 84. Resilient arm 86 is locked in position on non-rotating sleeve 88. Since detent 84 is locked on rim 83, detent 84 is rotated out of engagement with ball 85 when U.H.F. channel selector knob 64 is rotated by fine tuning knob 29 in a manner as hereinbefore described.

Figure 10:
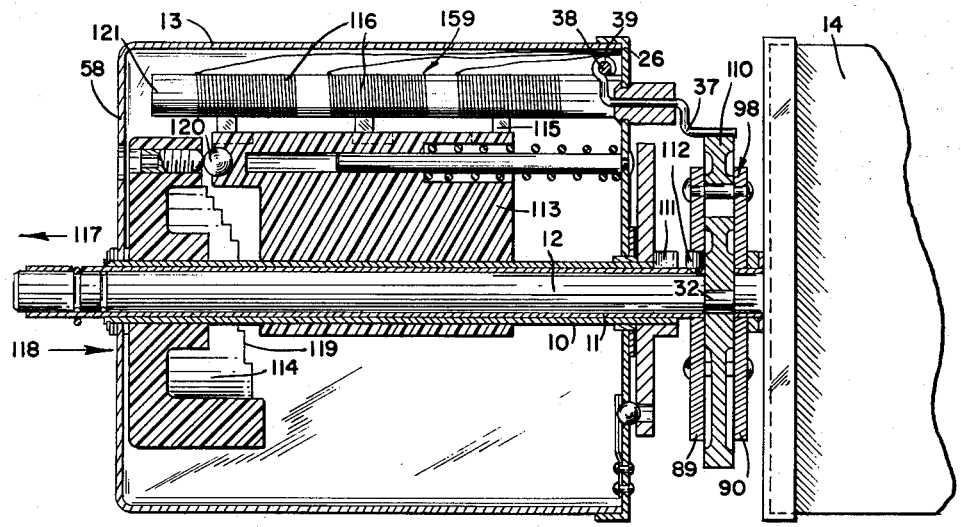
FIGURE 10 is a fragmentary cross sectional view illustrating a V.H.F. index mechanism utilizing a novel stair step detent and associated inductance tuner, and a fine tuner for the selected V.H.F. channel.

The embodiment of FIGURE 10 includes several features not found in the other figures. FIGURES 10 relates to a push-pull index mechanism. When a channel selector knob (not shown) is pulled in the horizontal direction of arrow 117, pin 112 of coupling means 98 engages with mating flange portion 111 of apertured detent disc 57 attached to V.H.F. tuning shaft 10. Coupling means 98 couples together two portions of shaft 11. Cam 110 located between front face 89 and rear face 90 of coupling means 98, is coupled to fine tuning shaft 12 by any suitable means. Rotational displacement of shaft 11 will rotationally displace shaft 10 when flange 111 mates with pin 112. Apertured detent disc 57 functions in the manner hereinbefore described. Securely attached to V.H.F. tuning shaft 10 is cup-shape positioner 114. The outer periphery of cup-shape positioner 114 has a series of stair-step notches 119 which are positioned adjacent a surface of ball 120 that is recessed in multi-position block 113. As shaft 11 is rotated in a counter-clockwise direction, a displacement of ball 120 and hence block 113 in the horizontal direction of arrow 118 is accomplished because of the interaction between stair-step notches 119 of cup-shaped positioner 114 and ball 120. Attached to and at a right angle with multi-position block 113 are a plurality of equally spaced wiper arms 115. A tuning coil 159 comprised of holding arm 121 with a plurality of independent coils 116 wound therearound are secured to rear wall 26 of V.H.F. tuner 13. The plurality of independent coils 116 are wound in a horizontal plane parallel to the horizontal plane of wiper arms 115 and are traversed as the wiper arms 115 are displaced in the horizontal direction of arrow 118 as cup-shaped positioner 114 is rotated in a clockwise direction, thus varying the inductive coupling of tuning coil 159. Apertured detent disc 57 locates a predetermined V.H.F. channel as disclosed hereinbefore. A fine tuning knob (not shown) coupled to fine tuning shaft 12 is rotated to fine tune V.H.F. tuner 13 in the manner as hereinbefore described in conjunction with FIGURE 1.

When a channel selector knob (not shown) is pushed in the direction of arrow 118, flange portion 111 ceases to mate with pin 112 and therefore the U.H.F. channel selection and the U.H.F. fine tuning is accomplished in the manner as hereinbefore described in conjunction with FIGURE 6.

The embodiment of FIGURE 11 includes several features not found in the other figures. Pin 122 is utilized to securely couple U.H.F. tuning shaft 123 to shaft 11. In addition, pin 122 is utilized to mate with flange portion 111 of apertured detent disc 57 which is firmly attached to V.H.F. tuning shaft 10. The tuning of V.H.F. tuner 13 is accomplished as described hereinbefore in conjunction with FIGURE 10. The V.H.F. tuner 13 is fine tuned in the manner as described hereinbefore in conjunction with FIGURE 5.

In order to retain a predetermined channel on U.H.F. tuner 14, suitable indexing mechanism as hereinbefore described may be provided, however, a preferred embodiment herein shown is an adjustable indexing mechanism indicated generally as reference numeral 124. Detent frame 125 is coupled to a combined U.H.F.-V.H.F. channel selector knob 126 by screw 127 and is provided with arcuate slot 128 concentrically aligned relative to the periphery of detent frame 125. A plurality of adjustable detents are positionable along the length of slot 128 in a selected angular position and are locked into position by the combination of the interaction between gear teeth 129 of U.H.F. detent 130 and the gear teeth 131 of the outermost portion of slot 128 and an engagable slide and spring combination 132 interfitting with innermost portion of slot 128 and gear teeth 129.

A detent 130' is permanently retained in position by rivet 161 and said detent indicates the position in which the V.H.F. tuner 13 is electrically inoperative. Thus if knob 126 is pushed in the horizontal direction of arrow 118, pin 122 disengages flange 111 and the U.H.F. tuner 14 can be tuned in a manner as hereinbefore described by selecting a predetermined U.H.F. channel.

Pin 133 passes through an aperture in knob 126 and engages arm 134. Arm 134 is coupled to positioning plate 20 by rivet 135. Positioning plate 20 is coupled to U.H.F. tuning shaft 11 as hereinbefore described. When knob 126 is rotated, pin 133 engages the aperture of knob 126 through which pin 133 extends and therefore pin 133 is displaced rotationally in direct proportion to the rotational displacement of knob 126. It is manifest that the U.H.F. tuning shaft 11 is displaced proportional to the displacement of knob 126. U.H.F. tuner 14 is fine tuned in the same manner as herein described in conjunction with FIGURE 1. V.H.F. tuner 13 is fine tuned in the same manner as herein described in conjunction with FIGURE 5.

The embodiment of FIGURES 13 and 14 pertain to a push-pull V.H.F.-U.H.F. index mechanism. Shaft 136 projects through an aperture (not shown) of television chassis 23 permitting a V.H.F.-U.H.F. combination channel selector knob 126 to be attached to shaft 136 and positioned without chassis 23 of the television receiver. Aperture 139 is centrally positioned on front end plate 138 forming the front end plate of U.H.F. tuner 14. Aperture 140 is centrally positioned on back end plate 137 forming a back end wall of U.H.F. tuner 14 and located opposite front end plate 138. Apertures 139 and 140 are positioned on a line so as to permit shaft 136 to traverse the length of U.H.F. tuner 14 and extend therethrough. Shaft 136 has coupled to its extremity opposite knob 126 a driving gear wheel 144.

Shaft 136 supports hollow shaft 141. Hollow shaft 141 projects through apertures 139 and 140 of U.H.F. tuner 14. Shaft 141 extends toward knob 126 but terminates a predetermined length before reaching knob 126. Shaft 141 is retained rotatably in position and prevented from moving longitudinally by washer 142 located on the front side of front wall plate 138 of U.H.F. tuner 14. Shaft 141 projects beyond rear plate 137 a sufficient length to provide a seat for gear tooth wheel 143 that is securely coupled to shaft 141. Gear tooth wheel 143 mates with driving gear wheel 144 of shaft 136 when shaft 136 is pulled in the horizontal direction of arrow 117. Manual rotation of knob 126 is transferred to U.H.F. tuning shaft 141 by cooperation of gear tooth wheel 143 and driving gear wheel 144, thus tuning U.H.F. tuner 14 in a manner as hereinbefore described.

The positioning and repositioning of adjustable detents 75 is accomplished in the same manner as described in conjunction with FIGURE 6.

U.H.F. channel indicator disc 145 is securely attached to shaft 141 and therefore rotatable therewith. The indicia printed on disc 145 is indicative of the channel position of shaft 141.

When knob 126 is pushed in the horizontal direction of arrow 118, shaft 136 moves in the direction of arrow 118 whereas shaft 141 is held in position with respect to shaft 136 by retaining washer 142. Driving gear wheel 144 moves out of mating engagement with gear tooth wheel 143 and into mating engagement with a second gear tooth wheel 146. Second gear tooth wheel 146 is so spaced from gear tooth wheel 143 such that when driving wheel 144 is engaged with one of said gear tooth wheels, it does not engage the other of said gear tooth wheels. Second gear tooth wheel 146 is firmly attached to V.H.F. tuning shaft 147 utilized to select a predetermined V.H.F. channel as described in conjunction with FIGURE 1.

A first gear wheel 148 is attached to the outer periphery of second gear tooth wheel 146 and is rotatable therewith. A second gear wheel 149 cooperates with first gear wheel 148 to transfer rotational movement of V.H.F. tuning shaft 147 to transfer shaft 150. The rotational movement of transfer shaft 150 is transferred to a third gear wheel 151 coupled to an extremity of transfer shaft 150 opposite the extremity to which second gear wheel 149 is attached. Third gear wheel 151 is coupled to a fourth gear wheel 152 which has printed thereon indicia of the V.H.F. television channel at which shaft 147 is located.

U.H.F. channel indicator disc 145 has cut therein a window 153 which allows indicia of the fourth gear wheel to be viewed from the exterior of television chassis 23. A magnifying element 154 and a light source 155 attached to chassis 23 cooperate to magnify and illuminate indicia appearing on U.H.F. disc 145 and fourth gear wheel 152.

A circular flange 156 engages switch arm 157 to an off position when driving gear wheel engages gear tooth wheel 143 of shaft 136. Switch 158 is utilized to activate or deactivate a V.H.F. tuner (not shown).

While the invention is illustrated and described in its preferred embodiments, it will be understood that modifications and variations may be effected without departing from the scope of the novel concepts of this invention and as set forth in the appended claims:

Having thus described my invention, I claim:

1. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to an apertured detent means for indexing said first shaft; a second shaft of said three coaxial, rotatable shafts carried within said first shaft and coupled to an adjustable detent means for indexing said second shaft; a third shaft of said three coaxial, rotatable shafts carried within said second shaft and coupled to a fine index means to fine index said second shaft; and three knobs one each of said knobs coupled to said three coaxial, rotatable shafts for indexing said shafts at a predetermined index position.

2. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to an apertured detent means for indexing said first shaft, said apertured detent means comprising a disc coupled to said first shaft wherein said disc includes a plurality of equally spaced apertures about the outer periphery of said disc and a permanently positioned spring biased ball that interfits with one of said apertures to locate said first shaft at a selected position; a second shaft of said three coaxial, rotatable shafts carried within said first shaft and coupled to an adjustable detent means for indexing said second shaft; a third shaft of said three coaxial, rotatable shafts carried within said second shaft and coupled to a fine index means to fine index said second shaft; and three knobs one each of said knobs coupled to said three coaxial, rotatable shafts for indexing said shafts at a predetermined index position.

3. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to an apertured detent means for indexing said first shaft; a second shaft of said three coaxial, rotatable shafts carried within said first shaft and coupled to an adjustable means for indexing said second shaft, said adjustable detent means comprising a plurality of resilient detents adjustably coupled to a circular groove of a knob coupled to said second shaft and a plunger means positioned adjacent said one of said plurality of resilient detents for adjusting the position of said resilient detents within said circular groove to thereafter index a predetermined position of said second shaft; a third shaft of said three coaxial, rotatable shafts carried within said second shaft and coupled to a fine index means to fine index said second shaft; and two knobs one each of said knobs coupled to said first and said third coaxial, rotatable shafts for indexing said shafts at a predetermined index position.

4. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to an apertured detent means for indexing said first shaft; a second shaft of said three coaxial, rotatable shafts carried within said first shaft and coupled to an adjustable detent means for indexing said second shaft; a third shaft of said three coaxial, rotatable shafts carried within said second shaft and coupled to a fine index means to fine index said second shaft, said fine index means comprising a portion of said third shaft that is smaller in diameter than said third shaft and said portion has its axis displaced from the axis of said third shaft, a pivotable means having one extremity coupled to said portion of said third shaft, a pivotable point located at the major axis of said pivotable means, means coupling said pivotable point of said pivotable means to a positioning means, and means coupling said positioning means to said second shaft to fine index said second shaft upon rotation of said third shaft; and three knobs one each of said knobs coupled to said three coaxial, rotatable shafts for indexing said shafts at a predetermined index position.

5. An index means for indexing a plurality of rotatable shafts comprising: a plurality of coaxial, rotatable shafts capable of independent rotation; means for supporting said plurality of coaxial, rotatable shafts; a first shaft of said plurality of coaxial, rotatable shafts coupled to a first means for indexing said first shaft; a second shaft of said plurality of coaxial, rotatable shafts carried within said first shaft and coupled to a second means for indexing said second shaft; a third shaft of said plurality of coaxial, rotatable shafts carried within said second shaft and coupled to a fine index means to fine index said second shaft; and a plurality of knobs one each of said knobs coupled to said plurality of coaxial, rotatable shafts for indexing said shafts at a predetermined index position.

6. An index means for indexing a plurality of rotatable shafts comprising; a plurality of coaxial, rotatable shafts capable of independent rotation; means for supporting said plurality of coaxial, rotatable shafts; a first shaft of said plurality of coaxial, rotatable shafts coupled to first detent means for indexing said first shaft; a second shaft of said plurality of coaxial, rotatable shafts carried within said first shaft and coupled to a second detent means for indexing said second shaft; a third shaft of said plurality of coaxial, rotatable shafts carried within said second shaft and coupled to a fine index means to fine index said second shaft; and a plurality of knobs one each of said knobs coupled to said plurality of coaxial, rotatable shafts for indexing said shafts at a predetermined index position.

7. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to a detent means for indexing said first shaft, said first shaft adapted to coarse index a tuner; a second shaft of said three coaxial, rotatable shafts carried within said first shaft and coupled to an adjustable detent means for coarse indexing said second shaft; a third shaft of said three coaxial, rotatable shafts carried within said second shaft; a first fine indexing means operatively coupled to said third shaft for fine indexing said tuner coarse indexed by said first shaft as said third shaft is rotatably displaced; a second fine index means coupled between said third shaft and said second shaft for fine indexing said second shaft as said third shaft is rotatably displaced; and three knobs one each of said knobs coupled to said three coaxial, rotatable shafts for rotating said shafts to a predetermined index position.

8. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to a detent means for indexing said first shaft, said first shaft adapted to coarse index a tuner; a second shaft of said three coaxial, rotatable shafts carried within said first shaft and coupled to an adjustable detent means for coarse indexing said second shaft; a third shaft of said three coaxial, rotatable shafts carried within said second shaft; a first fine indexing means operatively coupled to said third shaft for fine indexing said tuner coarse indexed by said first shaft as said third shaft is rotatably displaced, said first fine indexing means comprising a cam rotatably coupled to said third shaft, a movable wire mounted on the uppermost periphery of said cam and movable therewith, a slidable core coupled to said movable wire so that said slidable core is slidable in relation to an inductance coil to vary the inductance of said coil as said third shaft is rotated to fine index said first shaft; a second fine index means coupled between said third shaft and said second shaft for fine indexing said second shaft as said third shaft is rotatably displaced; and three knobs one each of said knobs coupled to said three coaxial, rotatable shafts for rotating said shafts to a predetermined index position.

9. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to a detent means for indexing said first shaft, said first shaft adapted to coarse index a tuner; a second shaft of said three coaxial, rotatable shafts carried within said first shaft and coupled to an adjustable detent means for coarse indexing said second shaft; a third shaft of said three coaxial, rotatable shafts carried within said second shaft; a first fine indexing means operatively coupled to said third shaft for fine indexing said tuner coarse indexed by said first shaft as said third shaft is rotatably displaced; a second fine index means coupled between said third shaft and said second shaft for fine indexing said second shaft as said third shaft is rotatably displaced, said second fine indexing means comprising a portion of said third shaft, a pivotable means having one extremity coupled to said portion of said third shaft and a pivotable point located at the major axis of said pivotable means, means coupling said pivotable point of said pivotable means to a positioning means, and means coupling said positioning means to said second shaft to fine index said second shaft upon rotation of said third shaft; and three knobs one each of said knobs coupled to said three coaxial, rotatable shafts for rotating said shafts to a predetermined index position.

10. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to a detent means for indexing said first shaft, said first shaft adapted to coarse index a tuner; a second shaft of said three coaxial, rotatable shafts carried within said first shaft and coupled to an adjustable detent means for coarse indexing said second shaft; a third shaft of said three coaxial, rotatable shafts carried within said second shaft; a first fine indexing means operatively coupled to said third shaft for fine indexing said tuner coarse indexed by said first shaft as said third shaft is rotatably displaced;

and three knobs one each of said knobs coupled to said three coaxial, rotatable shafts for rotating said shafts to a predetermined index position.

11. An index means for indexing two tuners possessing the capacity of receiving television signals in widely separated frequency ranges comprising: a plurality of coaxial, rotatable shafts capable of independent rotation; means for supporting said plurality of coaxial, rotatable shafts; a first shaft of said plurality of coaxial, rotatable shafts coupled to a detent means for indexing said first shaft, said first shaft adapted to coarse index a tuner; a second shaft of said plurality of coaxial, rotatable shafts carried within said first shaft and coupled to an adjustable detent means for coarse indexing said second shaft; a third shaft of said plurality of coaxial, rotatable shafts carried within said second shaft; a first fine indexing means operatively coupled to said third shaft for fine indexing said tuner coarse indexed by said first shaft as said third shaft is rotatably displaced; a second fine index means coupled between said third shaft and said second shaft for fine indexing said second shaft as said third shaft is rotatably displaced; and a plurality of knobs one each of said knobs coupled to said plurality of coaxial, rotatable shafts for rotating said shafts to a predetermined index position.

12. An index means for indexing two tuners possessing the capacity of receiving television signals in widely separated frequency ranges comprising: three coaxial, rotatable shafts capable of independent rotation; means for supporting said three coaxial, rotatable shafts; a first shaft of said three coaxial, rotatable shafts coupled to a detent means for indexing said first shaft, said first shaft adapted to coarse index a tuner; a second shaft of said three coaxial, rotatable shafts carried within said first shaft and coupled to an adjustable detent means for coarse indexing said second shaft; a third shaft of said three coaxial, rotatable shafts carried within said second shaft; a first fine indexing means operatively coupled to said third shaft for fine indexing said tuner coarse indexed by said first shaft as said third shaft is rotatably displaced, said first fine indexing means comprising a cam rotatably coupled to said third shaft, a movable wire mounted on the uppermost periphery of said cam and movable therewith, a slidable core coupled to said movable wire so that said slidable core is slidable in relation to an inductance coil to vary the inductance of said coil as said third shaft is rotated to fine index said first shaft; a second fine index means coupled between said third shaft and said second shaft for fine indexing said second shaft as said third shaft is rotatably displaced, said second fine indexing means comprising a portion of said third shaft, a pivotable means having one extremity coupled to said portion of said third shaft and a pivotable point located at the major axis of said pivotable means, means coupling said pivotable point of said pivotable means to a positioning means, and means coupling said positioning means to said second shaft to fine index said second shaft upon rotation of said third shaft; and three knobs one each of said knobs coupled to said three coaxial, rotatable shafts for rotating said shafts to a predetermined index position.

13. An index means for indexing two tuners possessing the capacity of receiving television signals in widely separated frequency ranges comprising: four coaxial, rotatable shafts; means for supporting said four coaxial, rotatable shafts; means fixedly coupling a second shaft to a fourth shaft of said four coaxial shafts so that said fourth shaft is rotatably displaced by rotational displacement of said second shaft; said second shaft coupled to an adjustable detent means for coarse indexing said fourth shaft as said second shaft is rotatably displaced; a first shaft of said four coaxial, rotatable shafts, said second shaft including means for engaging said first shaft when said second shaft is displaced to a first axial position, said second shaft and said first shaft operationally cooperating with a detent means fixedly coupled to said first shaft to index said first shaft as said first shaft is rotatably displaced by rotational displacement of said second shaft, said first shaft adapted to coarse index a tuner, thereafter axial displacement of said second shaft to a second axial position disengaging said first shaft and said second shaft so that rotational displacement of said fourth shaft by rotational displacement of said second shaft does not rotationally displace said first shaft; a first fine indexing means coupled to a rotatable third shaft of said four coaxial shafts for fine indexing said tuner coarse indexed by said first shaft as said third shaft is rotatably displaced; and a second fine indexing means coupled between said second shaft and said third shaft for fine indexing said fourth shaft through said second shaft as said third shaft is rotatably displaced.

14. An index means for indexing two tuners possessing the capacity of receiving television signals in widely separated frequency ranges comprising: four coaxial, rotatable shafts; means for supporting said four coaxial, rotatable shafts; means fixedly coupling a second shaft to a fourth shaft of said four coaxial shafts so that said fourth shaft is rotatably displaced by rotational displacement of said second shaft, said second shaft coupled to an adjustable detent means for coarse indexing said fourth shaft as said second shaft is rotatably displaced, said adjustable detent means including an annulus coupled to said second shaft and a circular groove cut in said annulus to mount a plurality of projecting means that are angularly adjustable to lock said annulus in a predetermined position; a first shaft of said four coaxial, rotatable shafts, said second shaft including means for engaging said first shaft when said second shaft is displaced to a first axial position, said second shaft and said first shaft operationally cooperating with a detent means fixedly coupled to said first shaft to index said first shaft as said first shaft is rotatably displaced by rotational displacement of said second shaft, said first shaft adapted to coarse index a tuner, thereafter axial displacement of said second shaft to a second axial position disengaging said first shaft and said second shaft so that rotational displacement of said fourth shaft by rotational displacement of said second shaft does not rotationally displace said first shaft; a first fine indexing means coupled to a rotatable third shaft of said four coaxial shafts for fine indexing said tuner coarse indexed by said first shaft as said third shaft is rotatably displaced; and a second fine indexing means coupled between said second shaft and said third shaft for fine indexing said fourth shaft through said second shaft as said third shaft is rotatably displaced.

15. An index means for indexing two tuners possessing the capacity of receiving television signals in widely separated frequency ranges comprising: three coaxial, rotatable shafts; means for supporting said three coaxial, rotatable shafts; a first shaft of said three coaxial, rotatable shafts coupled to a detent means for indexing said first shaft; a second shaft of said three coaxial, rotatable shafts predeterminately spaced from said first shaft and coupled to an adjustable detent means for indexing said second shaft; a third shaft of said three coaxial shafts carried within said second shaft; means for coupling said second shaft to said third shaft when said third shaft is in a second axial position; and means for coupling said first shaft to said third shaft when said third shaft is displaced to a first axial position, rotational displacement of said third shaft rotatably displacing said second shaft or said first shaft depending on the axial position of said third shaft.

References Cited by the Examiner

UNITED STATES PATENTS 2,837,933    6/58    Patla _____ 74—10.41 X

BROUGHTON G. DURHAM, *Primary Examiner.*

MILTON KAUFMAN, *Examiner.*